Feb. 7, 1967  O. S. WILLIAMS ETAL  3,302,276
FURNITURE FABRICATING METHOD
Filed June 6, 1963  2 Sheets-Sheet 1

INVENTORS
OSCAR STANLEY WILLIAMS,
ROBERT STANLEY WILLIAMS,

BY
Burns, Doane, Benedict, Swecker & Mathis
ATTORNEYS

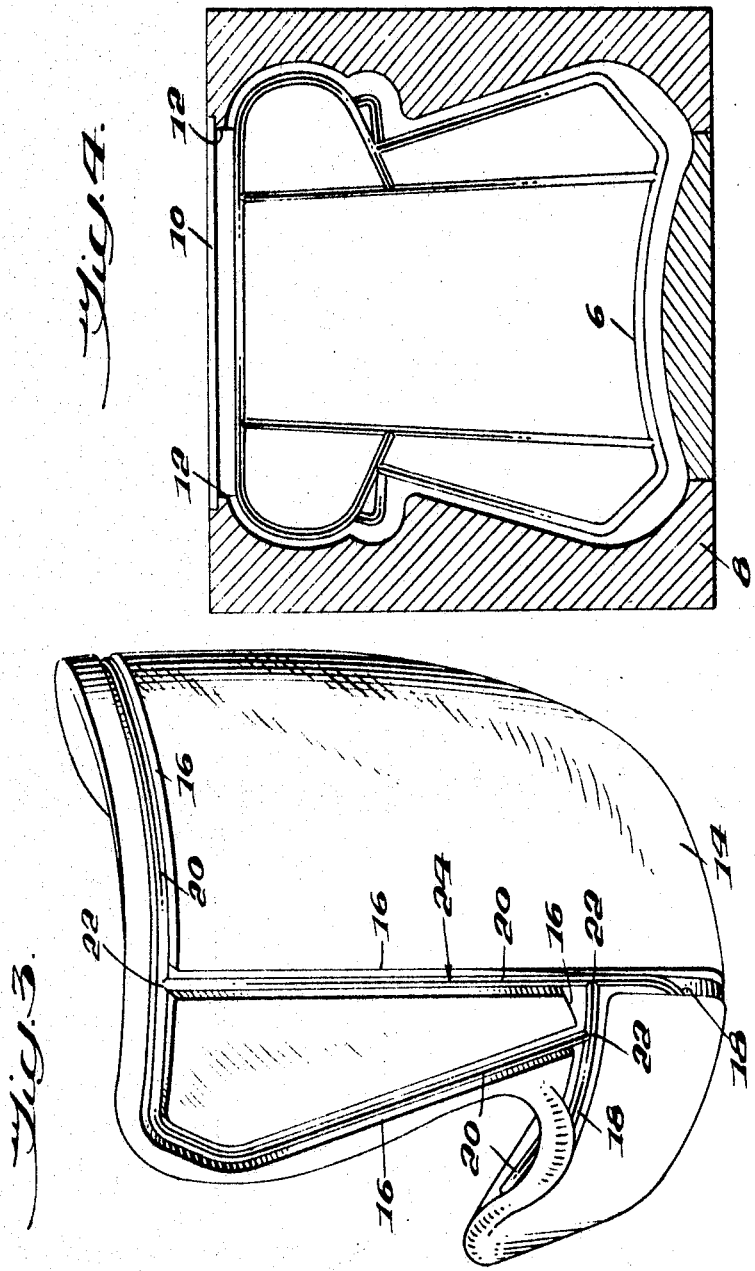

United States Patent Office 3,302,276
Patented Feb. 7, 1967

3,302,276
FURNITURE FABRICATING METHOD
Oscar Stanley Williams, Arlington, Ind. (R.D. 5, Rushville, Ind. 46173), and Robert Stanley Williams, Box 124, Arlington, Ind. 46104
Filed June 6, 1963, Ser. No. 285,935
6 Claims. (Cl. 29—407)

This invention relates to a method of making frames and more particularly to a method of forming and fabricating frames for upholstered furniture.

One type of upholstered furniture is formed of a foamed synthetic resin, such as polyurethane. The molded plastic foam is supported in the form of a furniture article by an internal frame which is fabricated preferably of metal tubes. An upholstered furniture article of this type is described in Patent No. 3,083,056.

The plastic furniture bodies are cast in a mold integrally with a metallic frame by placing the frame in the mold before the liquid plastic composition is poured into the mold. One of the advantages of using a foamed plastic is that it can be molded in a variety of shapes and designs and yet is inexpensive.

The conventional practice of molding a chair, for example, is to design a chair form and then to make a mold to reproduce the form of the design. After the mold is made, a frame is constructed by hand to fit properly into the mold cavity. The frame members are bent, cut and joined together to conform to the contour of the mold surface. The frame members must be sufficiently spaced from the mold surface, however, to be entirely enclosed by the plastic material and to ensure that no bulges or discoloration will indicate the position of the frame in the completed chair.

The forming and fitting of the prototype frame in the mold is laborious. Since portions of the mold cavity have an irregular contour or are inaccessible, a trial and error technique must be used. During the fitting process, it may also be necessary to cast sample chairs on the prototype frame to see that the frame is properly located with respect to the molded plastic chair body. After the prototype chair frame is developed, a jig may be made up to mass produce the frames in an identical form with that of the prototype frame. This method of producing a prototype frame is slow, wasteful, and expensive, and often the frame members are arranged inaccurately relative to the exterior surfaces of the chair.

Accordingly, it is an object of this invention to provide a method of fabricating furniture frames.

It is another object of this invention to provide a method of fitting frame members within a molded furniture body.

It is a further object of this invention to provide a method of producing a prototype frame for molded plastic furniture articles.

These objects are accomplished in accordance with the preferred embodiment of the invention by casting plastic foam material in a mold of the desired shape, removing the molded plastic body from the mold, fitting a frame to the molded body and fabricating frames in accordance with the fitted frame.

This preferred embodiment of the invention is illustrated in the accompanying drawings, in which:

FIG. 3 is a perspective view of a molded chair body with a frame fabricated thereon; and FIG. 4 is a cross-sectional view of a mold having a frame fitted therein.

Figure 2:
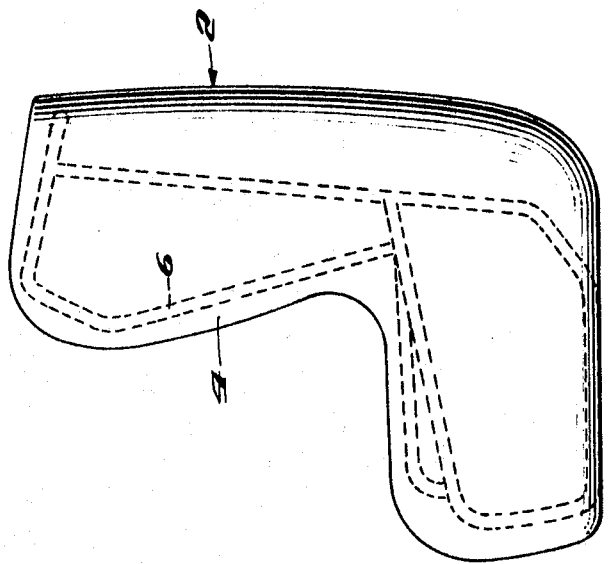
FIG. 2 is a side elevational view of the molded chair body.
Figure 1:
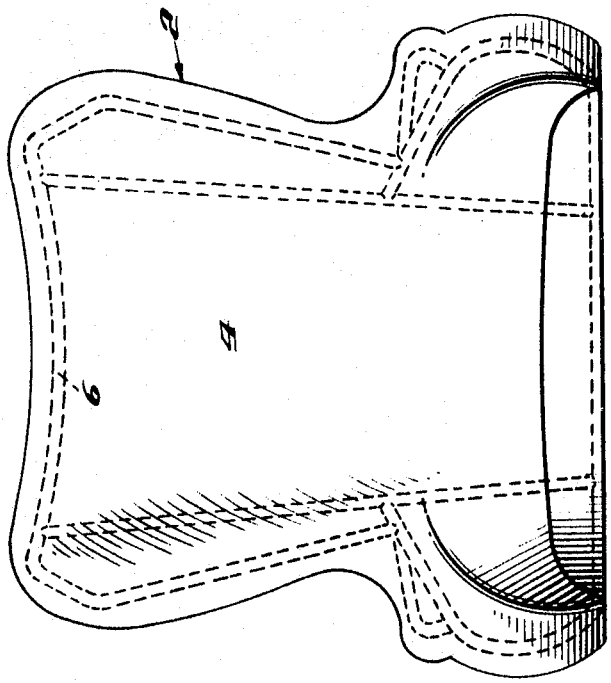
FIG. 1 is a front elevational view of an upholstered molded body of a chair having an internal frame.

Referring to FIGS. 1 and 2, a typical chair 2 having a foamed syntheic resin chair body 4 is molded over a metallic tubular frame 6. The frame 6 is shaped in a particular manner to support the back and the arms of the chair. The spacing of the frame members from the surface of the chair body 4 is not uniform. The frame 6 must be spaced sufficiently from the surface of the molded chair body 4 that it does not cause a bulge in the surface of the chair body, or permit a portion of the body to sag due to insufficient support.

A mold which may be used to form the chair body 4 is shown in FIG. 4. The mold 8 may be in several parts, so that it may be easily separated for removing the molded chair body. The frame 6 is suspended in the mold from a base 10 which is supported by a flange 12, or by other means on the mold 8. The frame 6 is spaced from the interior walls of the mold. In accordance with the prior art method of fabricating the frame 6, it was necessary to bend and shape tubular members of the frame 6 to fit approximately the contours of the interior of the mold 8. The frame members were welded together at the joints and then reinserted in the mold cavity to insure a proper fit. This prior art method required a considerable amount of trial and error and consequently wasted time and materials.

In accordance with the method of this invention, a chair body 14 is cast in the mold 8, without a frame, and removed from the mold. The chair body 14 has the desired shape of the chair, but is unsupported internally. Grooves or channels 16 are cut in the chair body 14 at the desired location of the frame members. The depth of the grooves 16 is greater than the thickness of the frame members to insure that the frames will be spaced internally of the surface of the chair body 14. At certain locations it may also be necessary to cut holes or openings 18 through portions of the chair body 14 for the insertion of frame members.

After the grooves 16 and holes 18 are cut in the chair body 14, frame members 20 are bent and formed to fit in the grooves 16 and through the holes or openings 18. The frame members 20 are disposed in the bottom of the grooves 18, so that they are spaced the desired distance from the surface of the chair body 14. As the frame members 20 are fitted into the grooves 16 and through the openings 18, they are welded together in the grooves at the joints 22 to form a unitary chair frame 24 which is properly fitted to the mold 8 and will occupy the desired position in a molded chair.

The chair body 14, which is reasonably pliable, is then removed from the prototype frame 24, either by bending the chair body 14, or cutting it sufficiently to remove the frame. The chair body 14 may then be discarded. Since the frame 24 has been formed on a chair body 14 which has the exact shape and dimensions of the cavity in the mold 8, it will fit exactly within the cavity and have the desired spacing from the interior walls of the mold 8. The prototype frame 24 is a pattern for setting up a jig in which the chair frames 6 are fabricated. Any conventional method may be used for insuring conformity of a production frame 6 with the prototype frame 24, but one convenient method is the use of a jig for clamping and forming the tubular members of the frame 6 in the desired position for welding the frame members together.

The method of designing and fabricating the chair frames in accordance with this invention results in a substantial saving in cost over the prior art methods of fitting the frame members within the mold cavity, since trial and error in the fitting process is eliminated. The frame members can be accurately located with respect to the surface of the molded chair body, since they are supported on the chair body during the fabrication process, while the frame members which are fitted within the mold cavity, in accordance with the prior art method, are unsupported during the fitting process. Another advantage of the method of this invention is that the frames are often fabricated by subcontractors who are located at great distances from the facility which mold the chair bodies. In the prior art method it is necessary for the subcontractors to go to the molding site to fit the prototype frame within the mold cavity. This is expensive not only because of the travel expense, but also because the mold cannot be used while the frame manufacturer is fitting a prototype frame to the mold. In the improved method of this invention, the frame manufacturer does not need to have access to the mold. A sample chair body, without the frame, is merely shipped to the frame manufacturer for his use in fabricating a prototype frame.

This invention has been illustrated and described with respect to the forming of a frame for an upholstered chair, but the method may be also used for fabricating a prototype frame for other types of upholstered foam plastic articles. While this invention has been illustrated and described in accordance with the preferred embodiment, it is recognized that variations and changes may be made therein without departing from the invention as set forth in the claims.

We claim:

1. A process for forming frames for chairs of the type having a chair body of a molded material comprising casting a chair body in a mold, removing the body from the mold, cutting out portions of the chair body to receive frame members, forming frame members within the cut out portions of the chair body and securing said frame members together on the chair body to form a prototype frame, removing the frame from the chair body, and fabricating additional frames patterned after the prototype frame which additional frames will accurately fit the mold.

2. A process for forming frames for chairs of the type having a chair body of a molded material comprising casting a chair body in a mold, removing the body from the mold, cutting out portions of the chair body to receive frame members, forming frame members within the cut out portions of the chair body, joining the frame members together on the chair body to form a prototype frame, removing the frame from the chair body, and fabricating additional frames patterned after the prototype frame which additional frames will accurately fit the mold.

3. A process for forming tubular metal frames for chairs of the type having a chair body of a molded material comprising casting a chair body in a mold, removing the body from the mold, cutting out portions of the chair body to receive frame members, joining together frame members to form a prototype frame on the chair body within the cut out portions of the chair body, removing the frame from the chair body, and fabricating additional frames patterned after the prototype frame whereby the additional frames will accurately fit in the mold.

4. A process for forming tubular metal frames for chairs of the type having a chair body of a molded material comprising casting a chair body in a mold, removing the body from the mold, cutting out portions of the chair body to receive frame members, bending frame members within the cut out portions of the chair body, joining the frame members together on the chair body to form a prototype frame, removing the frame from the chair body, and fabricating additional frames patterned after the prototype frame whereby additional frames are produced which will accurately fit in the mold.

5. A process for forming an internal support frame for a molded body of an article comprising casting the body in a mold, removing the body from the mold, cutting out portions of the body to receive frame members, and fabricating a prototype frame on the body within the cut out portions, removing the body from the prototype frame and fabricating additional frames patterned after the prototype frame whereby additional frames are provided which accurately fit in said mold.

6. A process for forming frames for chairs of the type having a chair body of a molded material comprising casting a chair body in a mold, removing the body from the mold, cutting away portions of the chair body to receive frame members, fabricating a prototype frame in said portions of the chair body, fabricating additional frames patterned after the prototype frame whereby additional frames are provided which accurately fit in said mold, mounting each said additional frame in the mold, and molding a chair body on the frame.

References Cited by the Examiner

UNITED STATES PATENTS

| | | | |
|---|---|---|---|
| 2,682,111 | 6/1954 | Kish | 264—275 X |
| 2,838,100 | 6/1958 | Follows. | |
| 2,853,122 | 9/1958 | Shapiro. | |
| 3,083,056 | 3/1963 | Ward | 297—452 |
| 3,084,980 | 4/1963 | Lawson | 297—452 X |
| 3,133,765 | 5/1964 | Kramer. | |
| 3,144,271 | 8/1964 | Lieberman et al. | |

CHARLIE T. MOON, *Primary Examiner.*